(12) United States Patent
Gianzero et al.

(10) Patent No.: US 7,227,363 B2
(45) Date of Patent: *Jun. 5, 2007

(54) DETERMINING FORMATION ANISOTROPY BASED IN PART ON LATERAL CURRENT FLOW MEASUREMENTS

(76) Inventors: Stanley C. Gianzero, 34 Sundown Pkwy., Austin, TX (US) 76201; Michael S. Bittar, 8711 Wheatland Dr., Houston, TX (US) 77064

(*) Notice: Subject to any disclaimer, the term of this patent is extended or adjusted under 35 U.S.C. 154(b) by 272 days.

This patent is subject to a terminal disclaimer.

(21) Appl. No.: 10/957,415

(22) Filed: Oct. 1, 2004

(65) Prior Publication Data

US 2005/0099184 A1 May 12, 2005

Related U.S. Application Data

(63) Continuation-in-part of application No. 10/173,528, filed on Jun. 17, 2002, now Pat. No. 6,958,610.

(60) Provisional application No. 60/302,823, filed on Jul. 3, 2001.

(51) Int. Cl.
*G01V 3/18* (2006.01)
*G01V 3/08* (2006.01)

(52) U.S. Cl. .................. 324/342; 324/338; 324/333

(58) Field of Classification Search ............... None
See application file for complete search history.

(56) References Cited

U.S. PATENT DOCUMENTS

| | | | | |
|---|---|---|---|---|
| 3,007,107 A | * | 10/1961 | Gondouin | 324/359 |
| 3,079,550 A | * | 2/1963 | Huddleston, Jr. et al. | 324/371 |
| 4,302,722 A | | 11/1981 | Gianzero | |
| 4,302,723 A | | 11/1981 | Moran | |
| 4,553,097 A | * | 11/1985 | Clark | 324/338 |
| 4,626,785 A | * | 12/1986 | Hagiwara | 324/339 |

(Continued)

FOREIGN PATENT DOCUMENTS

EP   0 527 089 A2   2/1993

(Continued)

OTHER PUBLICATIONS

Moran, J. H. and Gianzero, S., 1979, Effects of formation anisotropy of resistivity-logging measurements: Geophysics, 44, pp. 1273.

(Continued)

*Primary Examiner*—Jay M. Patidar
(74) *Attorney, Agent, or Firm*—Conley Rose, PC

(57) ABSTRACT

Disclosed herein are methods and apparatus using one or more toroids to measure formation anisotropy and/or vertical conductivity. In one embodiment, a disclosed method comprises: inducing a current to flow through a conductive surface of a tool body into a surrounding formation; measuring a lateral portion of the current flow; and calculating an anisotropy coefficient from the apparent conductivity so measured. The lateral current flow may be that portion of the current flowing through the tool body surface between two predetermined, axially spaced, circumferences of the tool. In an alternative embodiment, a disclosed logging tool comprises: a substantially cylindrical and conductive tool body, a toroidal transmitter, and a current measuring means. The current measuring means is configured to measure that portion of an induced current that radiates through a predetermined surface of the tool into the formation.

21 Claims, 12 Drawing Sheets

U.S. PATENT DOCUMENTS

| | | | |
|---|---|---|---|
| 5,045,795 A | | 9/1991 | Gianzero et al. |
| 5,235,285 A | | 8/1993 | Clark |
| 5,339,036 A | * | 8/1994 | Clark et al. ................. 324/338 |
| 5,510,712 A | * | 4/1996 | Sezginer et al. ............ 324/368 |
| 5,966,013 A | * | 10/1999 | Hagiwara .................... 324/339 |
| 6,057,784 A | | 5/2000 | Schaaf et al. |
| 6,064,210 A | * | 5/2000 | Sinclair ....................... 324/369 |
| 6,181,138 B1 | * | 1/2001 | Hagiwara et al. ........... 324/338 |

FOREIGN PATENT DOCUMENTS

| | | |
|---|---|---|
| EP | 0 869 376 A2 | 7/1998 |
| WO | WO 00 50926 | 8/2000 |

OTHER PUBLICATIONS

Kuntz, K., and Moran, J. H., S., 1962, Basic theory of induction logging and application to study two-coil sondes: Geophysics, 27, pp. 829-858.

Kuntz, K., and Moran, J. H., S., 1958, Some effects of formation anisotropy on resistivity measurements in boreholes: Geophysics, 23, pp. 770-794.

Moran, J. H. and Gianzero, S., 1979, Effects of formation anisotropy of resistivity-logging measurements: Geophysics, 44, pp. 1276.

Chemali, R., Gianzero, S. and S.M. Su, 1987, The effect of shale anisotropy on focused resistivity devices: SPWLA 28th Ann. Logging Symp., paper H.

Anderson, B. et al., 1990, Response of 2-MHz LWD resistivity and wireline induction tools in dipping beds and laminated formations: SPWLA 31st Ann. Logging Symp., paper A.

Luling, M. et al., 1994, Processing and modeling 2-MHz resistivity tools in dipping laminated, anisotropic formations: SPWLA 35th Ann. Logging Symp., paper QQ.

Hagiwara, T., 1995, Induction log analysis of thinly laminated sand/shale formation: SPE Formation Evaluation, June, pp. 86-90.

Hagiwara, T., 1996, EM log response to anisotropic resistivity in thinly laminated formations with emphasis on 2-MHz resistivity devices: SPE Formation Evaluation, December, pp. 211-217.

Tabarovsky, L., Epov, M., and Kagansky, A., 1977, Focusing systems of inductance logging in anisotropic media: Geol. i Geofiz, No. 9.

Xiao, J., Beard, D., and Zhou, Q., 1996, A practical dipping-effect correction for multiarray induction tools in deviated wells; SPWLA 37th Ann. Logging Symp., paper R.

Gianzero, S., 1999, The paradox of anisotropy revisited: The Log Analyst, vol. 40, No. 6, pp. 485-491.

Gianzero, S. et al., 1985, A new resistivity tool for measurement-while-drilling: SPWLA 26th Ann. Logging Symp., paper A.

Kriegshauser, B. et al., 2000, A new multicomponent induction logging tool to resolve anisotropic formations: SPWLA 41st Ann Logging Symp., Paper D.

British Search Report dated Jan. 28, 2003, Application No. GB 0214674.4 (2 p.).

French Search Report dated Feb. 21, 2003, Application No. FA 620652 (2 p.).

* cited by examiner

DETERMINING FORMATION ANISOTROPY BASED IN PART ON LATERAL CURRENT FLOW MEASUREMENTS

CROSS-REFERENCE TO RELATED APPLICATIONS

This application claims priority to U.S. patent application Ser. No. 10/173,528, filed on Jun. 17, 2002 now U.S. Pat. No. 6,958,610, and entitled "Method And Apparatus Using Antennas To Measure Electrical Anisotropy," and U.S. Provisional Patent Application No. 60/302,823 filed on Jul. 3, 2001, and entitled "Method And Apparatus Using Toroidal Antenna for Measuring Electrical Anisotropy." This application is also related to commonly owned U.S. Pat. No. 6,181,138, issued Jan. 30, 2001, and entitled "Directional Resistivity Measurements for Azimuthal Proximity Detection of Bed Boundaries." These references are incorporated herein by reference.

BACKGROUND

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing electrical current flows in nearby formations in response to an AC transmitter signal, and then measuring the appropriate characteristics of a receiver signal generated by the induced current flows. The formation properties identified by these signals are then recorded in a log at the surface as a function of the depth of the tool in the borehole.

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

In many sedimentary strata, electrical current flows more easily in a direction parallel to the bedding planes, as opposed to a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

Macroscopic anisotropy, on the other hand, occurs in subterranean formations made up of a series of relatively thin beds having different lithological characteristics and, therefore different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_H$. The inverse of $\rho_H$ is the horizontal conductivity $\sigma_H$. The resistivity of the sample measured with a current flowing perpendicular to the bedding plane is called the longitudinal or vertical resistivity, $\rho_v$, and its inverse the vertical conductivity $\sigma_v$. The anisotropy coefficient $\lambda$ is defined as:

$$\lambda = \sqrt{\sigma_h / \sigma_v}. \quad (1)$$

In situations where the borehole intersects the formation substantially perpendicular to the bedding planes, conventional induction and propagation well logging tools are sensitive almost exclusively to the horizontal component of the formation resistivity. This is a consequence of the induced currents flowing in horizontal planes in the absence of formation dip or well deviation. Indeed, in the context of galvanic devices, the lack of sensitivity to anisotropy is even more stringent due to the "paradox of anisotropy," which states that any array of electrodes or sensors deployed along the axis of a wellbore in a vertical well is insensitive to the vertical component of resistivity, despite the intuitive expectation to the contrary.

At present, there exists only one commercial instrument that measures the vertical resistivity. B. Kriegshauser, et al., describe this instrument in "A new multicomponent induction logging tool to resolve anisotropic formations," $41^{st}$ Annual Logging Symposium, Society of Professional Well Log Analysts, paper D, pps. 1–14, 2000. This instrument employs multiple multi-component coils (i.e., transmitter and receiver coils having axial and transverse orientations). This instrument may be unduly complex and provide measurements that are difficult to interpret. Further, the design of this wireline instrument may not be adaptable to a measurement while drilling (MWD) implementation. A simpler method and apparatus for measuring vertical resistivity would be desirable.

SUMMARY

Accordingly, there is disclosed herein methods and apparatus using one or more toroids to measure formation anisotropy and/or vertical conductivity. In one embodiment, a disclosed method comprises: (a) causing an alternating current to flow along the conductive surface of a tool body so as to radiate into a surrounding formation; (b) measuring a lateral current flow from the tool body; (c) determining an apparent conductivity of the formation from an in-phase component of the lateral current flow measurement; and (d) calculating an anisotropy coefficient from the apparent conductivity. The lateral current flow may be that portion of the current flowing through the tool body surface between two predetermined, axially spaced, circumferences of the tool.

In an alternative embodiment, a disclosed logging tool comprises: a substantially cylindrical and conductive tool body, a toroidal transmitter, and a current measuring means. The current measuring means is configured to measure that portion of an induced current that radiates through a predetermined surface of the tool into the formation.

The disclosed methods, apparatuses, and systems may provide advantages in determining the parameters of anisotropic earth formations in both wireline applications and/or MWD applications. For example, the tool is expected to work particularly well in high-conductivity formations where the existing induction tools are deficient due to skin effect. Additionally, because the sensitivity to anisotropy is a volumetric effect as opposed to a boundary effect for galvanic devices, there is a greater sensitivity to anisotropy. In addition due to the fact that the tool operates on straightforward principles, the ease of log interpretation is enhanced. Also, in the case of MWD, the tool design advantageously reduces the borehole and invasion effects on the measurement and enhances the depth of investigation.

BRIEF DESCRIPTION OF THE DRAWINGS

A better understanding of the disclosed embodiments can be obtained when the following detailed description is considered in conjunction with the following drawings, wherein like parts have been given like numbers.

DETAILED DESCRIPTION

Terminology

It is noted that the terms horizontal and vertical as used herein are defined to be those directions parallel to and perpendicular to the bedding plane, respectively.

Tool Environment

Figure 13:
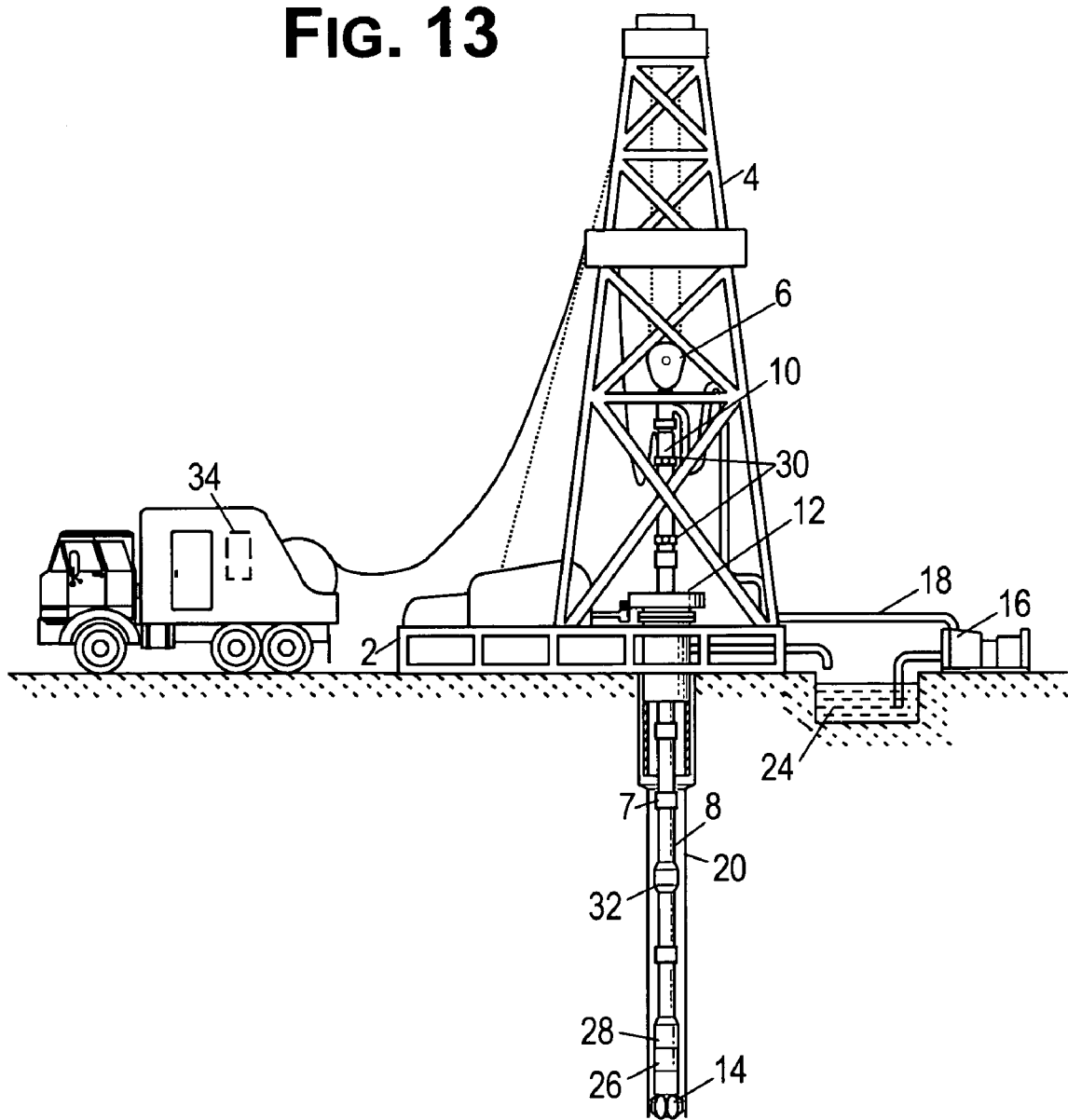
FIG. 13 shows an illustrative context for use of the disclosed embodiments.

FIG. 13 shows a well during drilling operations. A drilling platform 2 is equipped with a derrick 4 that supports a hoist 6. Drilling of oil and gas wells is often carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, somewhat misleadingly called "mud", is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

Logging while drilling (LWD) is carried out by downhole sensors 26, which may be coupled to a telemetry transmitter 28 that transmits telemetry signals. In one embodiment, telemetry transmitter 28 is an acoustic transmitter that generates acoustic vibrations in the tubing wall of drill string 8. A telemetry receiver array 30 may be coupled to the kelly 10 to receive transmitted telemetry signals. One or more repeater modules 32 may be provided along the drill string to receive, amplify, and retransmit the telemetry signals.

Surface processing equipment 34 receives the telemetry signals and stores the measurements, typically along with some indication of the tool position. Though shown as a module in a logging truck, the surface processing equipment may take many forms, including that of a personal computer with a data acquisition card. From the measurements, the surface processing equipment can generate logs of formation properties, including resistivity logs. In the context of the present disclosure, the surface processing equipment may determine one or more logs of horizontal conductivity/resistivity, vertical conductivity/resistivity, and the anisotropy coefficient.

Tool Configuration

Figure 1:
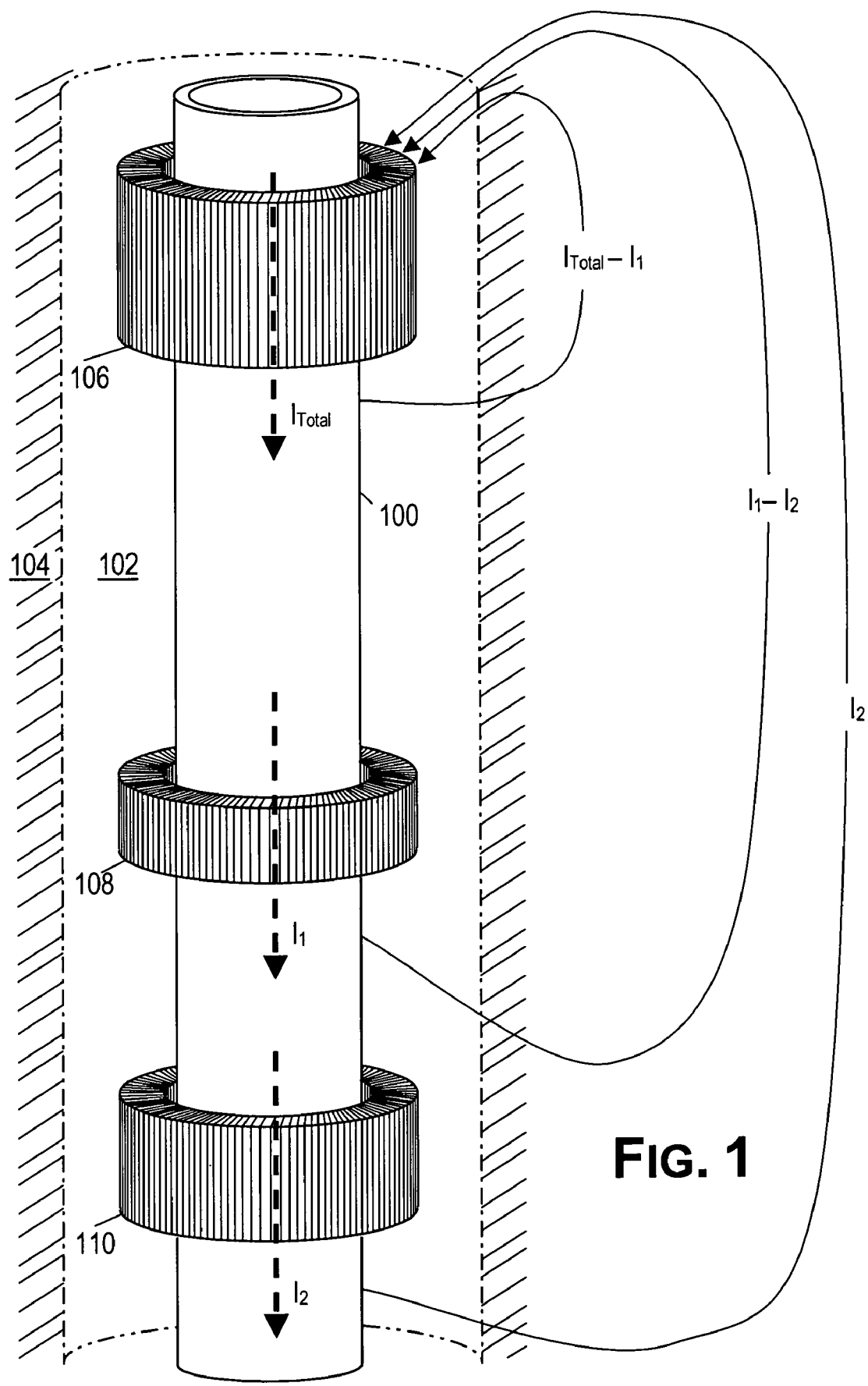
FIG. 1 shows an antenna configuration for an anisotropy tool using toroidal receivers and transmitters.

FIG. 1 shows an antenna configuration for a logging tool 100 that is part of drillstring located in a wellbore 102 that passes through a formation 104. The tool includes at least one transmitter antenna 106 and at least two receiver antennas 108, 110. The transmitter antenna 106 and receiver antennas 108 and 110 are toroidal antennas, although as explained below the antennas 106, 108, and 110 may include other antenna types. A toroidal antenna has a spirally-wound high-permeability core that forms a closed loop around an electrical conductor. In the logging tool 100, the electrical conductor is preferably a portion of a drill string, but it is not so limited, in fact the logging tool 100 also lends itself to wireline applications. In the illustrated embodiment, the core is circular with a generally-rectangular cross section, but other geometries (e.g., a circular cross-section) would also suffice.

The toroidal transmitter antenna 106 operates when an alternating current is supplied to the spiral wire winding around the antenna core. A changing current flow in the winding induces a changing magnetic field in the core, which in turn induces a current $I_{Total}$ in the logging tool 100. The current $I_{Total}$ flows along the logging tool 100 where part of the current $I_{Total}-I_1$ radiates into the formation and returns to the drillstring on the opposite side of the transmitter antenna 106, and the rest of the current $I_1$ continues to flow in the logging tool 100 through the toroidal receiver 108. The toroidal receivers 108 and 110 operate when a changing current flows along the enclosed electrical conductor, in this case logging tool 100. Current $I_1$ flows along the logging tool 100 and induces a changing magnetic field in the core of receiver 108, which in turn induces a changing voltage that is measured in the winding of the receiver 108. At this point, part of the current $I_1-I_2$ radiates into the formation just after the receiver 108 and returns to the drillstring on the opposite side of the antenna 106, and the rest of the current $I_2$ continues along the drillstring to the toroidal receiver 110.

The voltage in the winding of toroidal receiver 110 generated as a result of $I_2$ is measured similarly to the voltage measurement of the receiver 108. The logging tool 100 is thereby able to determine the amount of current radiated into the formation in each of two regions. The current $I_2$ that passes through receiver 110 is radiated from the drillstring in the region below receiver 110 (the "bit region"). The current that passes through receiver 108 minus the current that passes through receiver 110 ($I_1$–$I_2$) is radiated from the drillstring in the region between the receivers (the "lateral region"). It should be noted that receiver 108 and receiver 110 are intended to be used in a differential manner such that the voltage difference between the receivers results from the difference in their respective current flows or the difference in their magnetic fields. Thus, the amount of current dissipated into the lateral region can be easily calculated and the width of the lateral region is varied as the distance between the toroidal receivers 108 and 110.

Note that toroidal receivers being used in a differential arrangement may be sized differently depending upon their relative proximity to the transmitter so as to achieve zero offset. For example, receiver 108 as shown in FIG. 1 is sized smaller than receiver 110 because the magnetic field induced by transmitter 106 is stronger in receiver 108 than in receiver 110 due to their relative distance from the transmitter 106. It should be noted that the although the system described in FIG. 1 has been addressed in the context of a MWD application, it is not so limited and may be applied to wireline applications.

Figure 2:
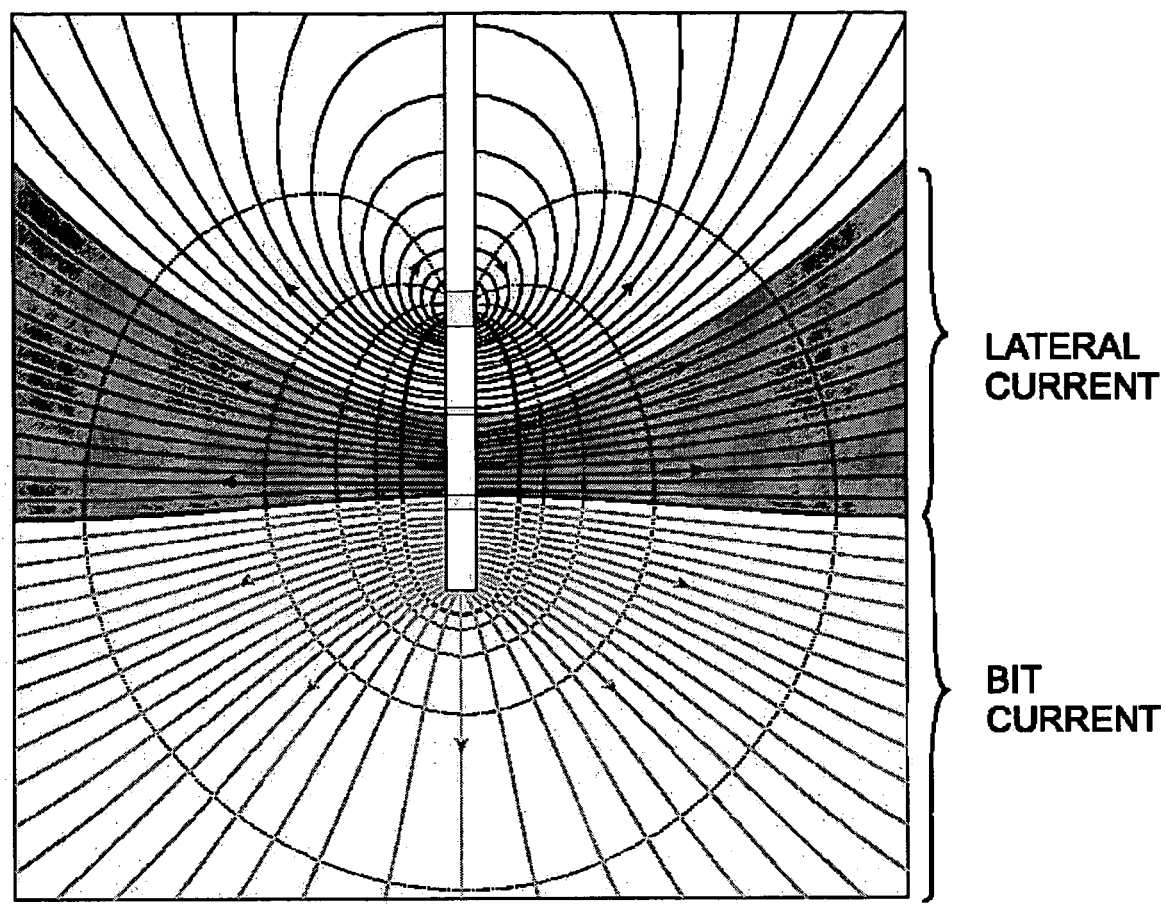
FIG. 2 shows a theoretical formation current flow induced in an isotropic formation by a toroid tool of FIG. 1.

FIG. 2 shows current flow lines (and equipotential lines) indicated by numerical simulation for an isotropic formation. The lateral current $I_1$–$I_2$ is shown as well as the bit current $I_2$. Of course, these current lines will be different for anisotropic formations, but the general principle remains the same.

Figure 3:
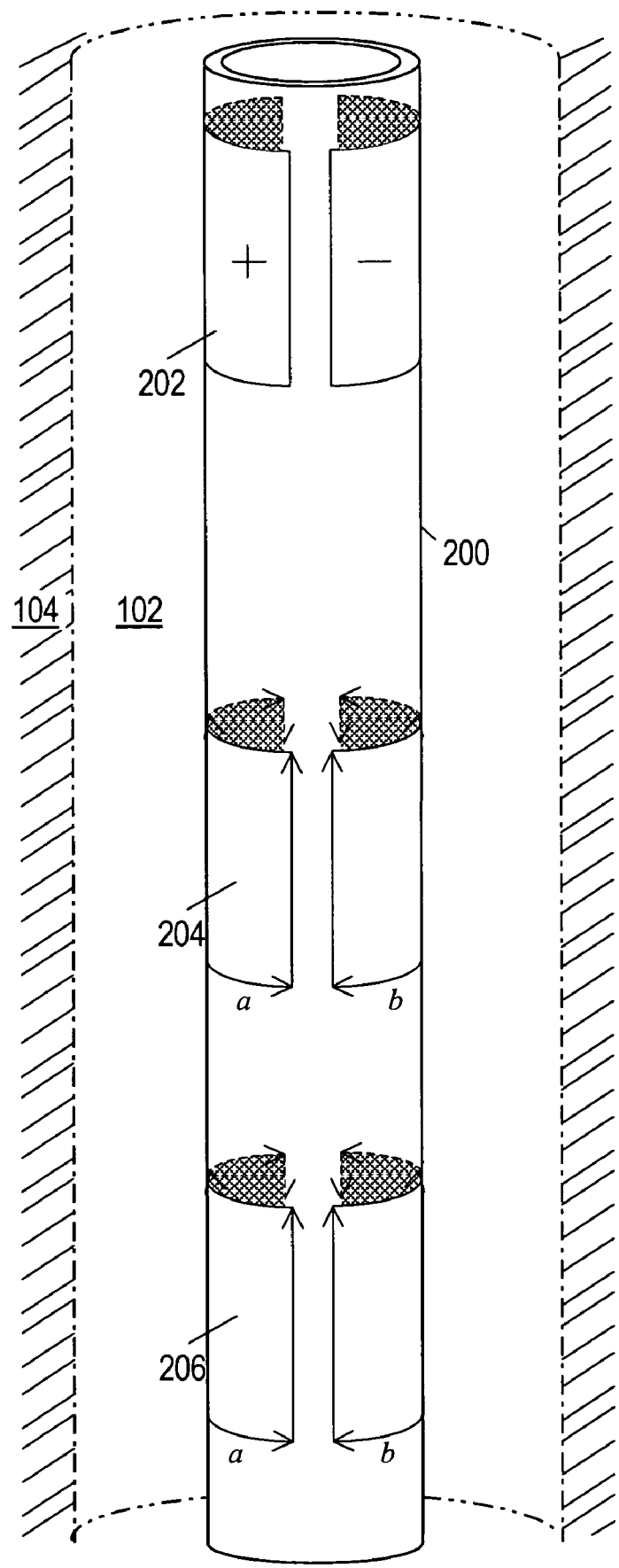
FIG. 3 shows another antenna configuration for an anisotropy tool using a horizontal electric dipole transmitter.

An alternative antenna configuration is shown in FIG. 3, where alternate antenna combinations of horizontal electric dipoles (HED) and horizontal magnetic dipoles (HMD) are used. A HED antenna includes two wires or electrodes oriented opposite each other. Each wire in the HED represents a pole (e.g., a positive pole and a negative pole), such that as an electromotive force is applied to the HED, an electric field is generated. A HMD antenna includes a coil of wire having two ends where an electromotive force is applied that in turn generates a magnetic field. The magnetic field orients itself to the dipoles of the HMD in a similar manner that the electric field orients itself to the dipoles of the HED. Akin to FIG. 1, FIG. 3 shows a logging tool 200 that is part of a drillstring located in a wellbore 102 that passes through a formation 104. The tool includes at least one transmitter antenna 202, which preferably is a HED. Also there are at least two receiver antennas 204 and 206 both configured as HMD. As one ordinary of skill in the art having the benefit of this disclosure will appreciate, the system described in FIG. 3 is generally applicable to wireline applications, however it may also be applicable to MWD applications.

The transmitter 202 operates when an alternating voltage is applied to it and electric fields are generated in the formation 104. The electric fields induced in the formation 104 by the transmitter 202 bring about currents. Since the formation 104 is both reactive and resistive, there are resistive currents induced that are in phase, and reactive currents that are in quadrature (i.e., 90° out of phase). These currents further induce magnetic fields in the formation 104 that are proportional to the amount of resistance and/or reactance present. The induced magnetic fields are measured at various positions along the logging tool 200 by the receiver 204 and the receiver 206.

The receivers 204 and 206 preferably are fashioned such that the coil is formed around the periphery of the cylindrical sections a and b as indicated by the directional arrows. In general, receivers 204 and 206 provide a measurable voltage in coils a and b that is proportional to the magnetic field passing through them. Receivers 204 and 206 may operate in a differential manner such that the voltage appearing in coils a and b of receiver 204 minus the voltage appearing in coils a and b of receiver 206 is the desired measurement.

It should be noted that although FIG. 3 shows a specific combination using a HED for the transmitter and two HMDs for the receivers, a converse arrangement would be evident to one of ordinary skill in this art in having the benefit of this disclosure. For example, a HMD may be used as the transmitter while HEDs may be used as the differential receivers. Furthermore, additional receivers may be fashioned along the logging tool to provide measurements at different effective depths in the formation. Also, the receivers and/or transmitters may be azimuthally tunable resistivity measurement tools as described in commonly owned U.S. Pat. No. 6,181,138. In this manner, specific coil configurations can be synthesized to provide the optimum transmit and receive structures in accordance with the preferred embodiments disclosed herein.

The apparent conductivity of the formation is a function of the voltages measured by the two receiver antennas. The voltage measured from each receiver has an in-phase component resulting from resistive formations and a quadrature component resulting from reactive components. The apparent conductivity may be calculated from the difference between the in-phase voltages measured by the receiver antennas:

$$\sigma_a = K(V_2 - V_1), \qquad (2)$$

where $V_1$ and $V_2$ are the voltages received in-phase with the transmitter signal ("resistive component"), and K is a constant for the logging tool. It should be noted that determining the apparent conductivity and/or calculating the anisotropy coefficient as described above may be done by either the logging tool or the processing equipment located at the surface (not shown in the drawings.)

Figure 4:
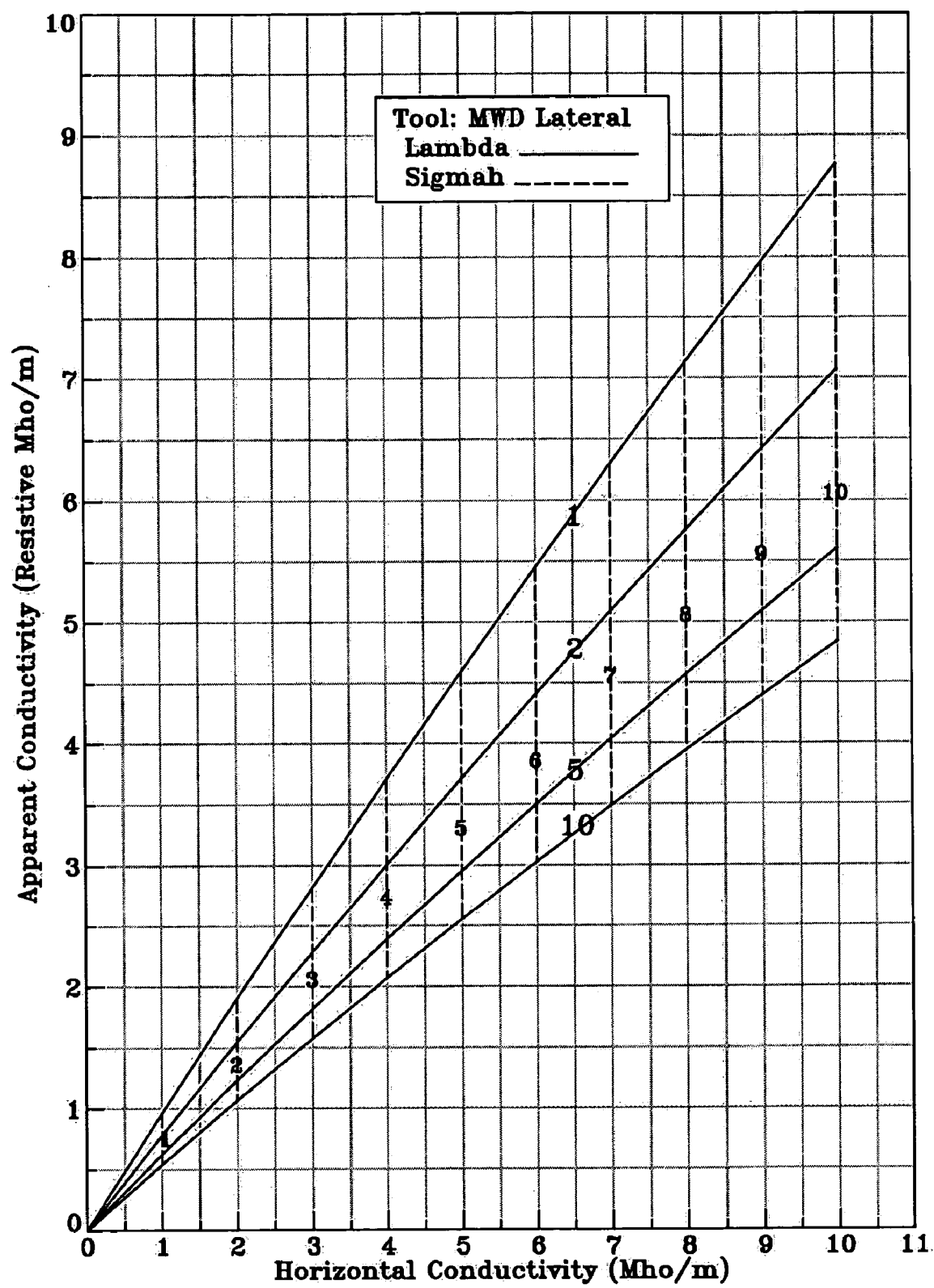
FIG. 4 is a graph relating apparent conductivity to horizontal conductivity for different formation anisotropies.

As shown in FIG. 4, the apparent conductivity is a function of both the horizontal conductivity and the anisotropy coefficient of Equation (1). In one embodiment of tool 100, an unrelated method is used to determine the horizontal conductivity. For example, a standard induction tool may be used to measure the $\sigma_h$. With the horizontal conductivity measurement from the unrelated source and the apparent conductivity measurement from the present logging tool, the anisotropy coefficient can be determined from the function shown in FIG. 4. The vertical conductivity can then be determined from the horizontal conductivity measurement and the anisotropy coefficient.

Figure 5:
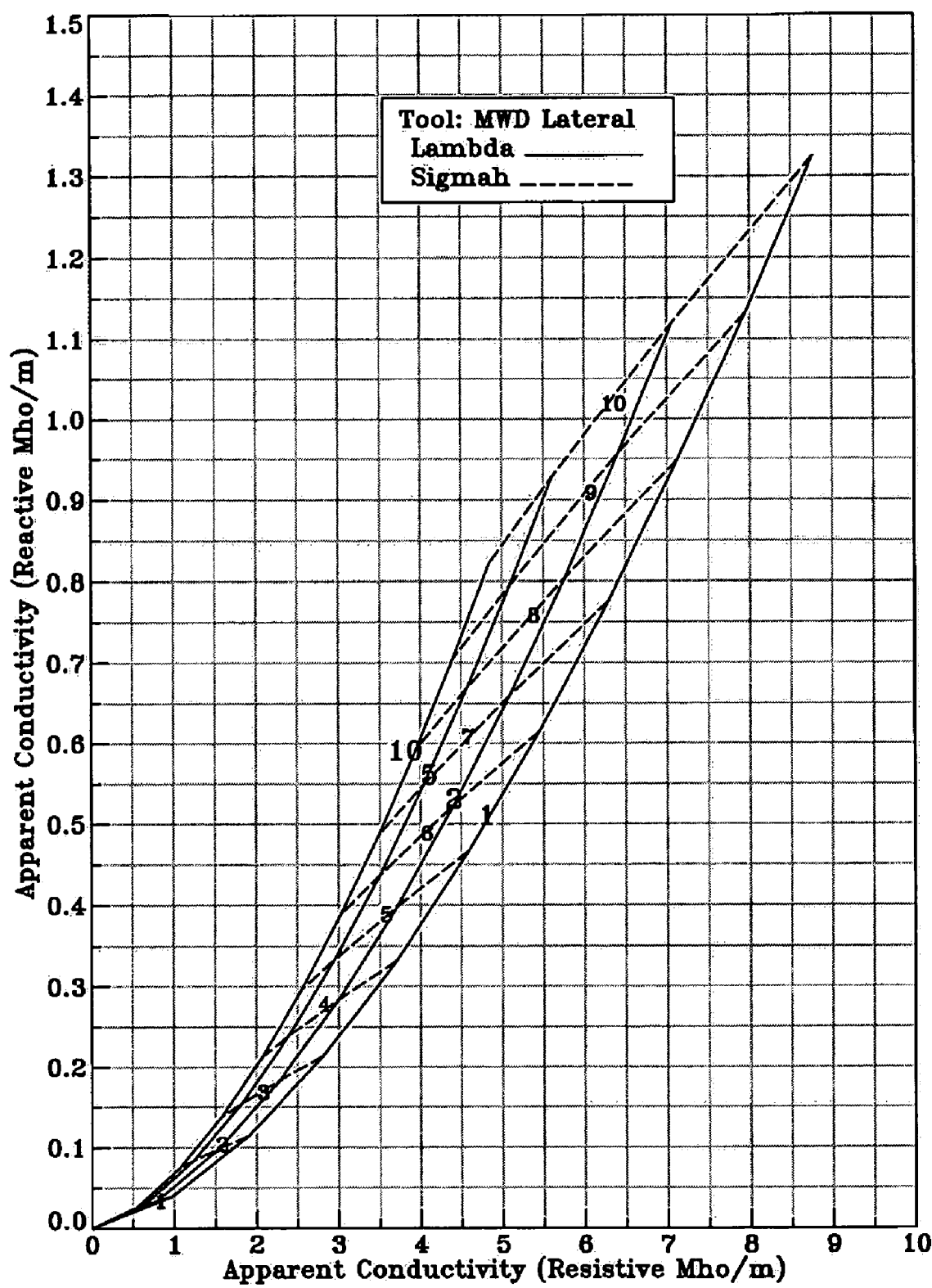
FIG. 5 is a graph relating apparent resistivity to apparent reactivity for different formation anisotropies.

If a separate determination of horizontal conductivity is unavailable or infeasible, then the present logging tool can be configured to determine the apparent conductivity from the reactive components of the receiver signals in addition to the apparent conductivity from the resistive components of the receiver signals. From the resistive and reactive apparent conductivities, both the horizontal conductivity and the anisotropy coefficient can be determined as shown in FIG. 5. If desired, the vertical conductivity may be calculated from these values.

Figure 6:
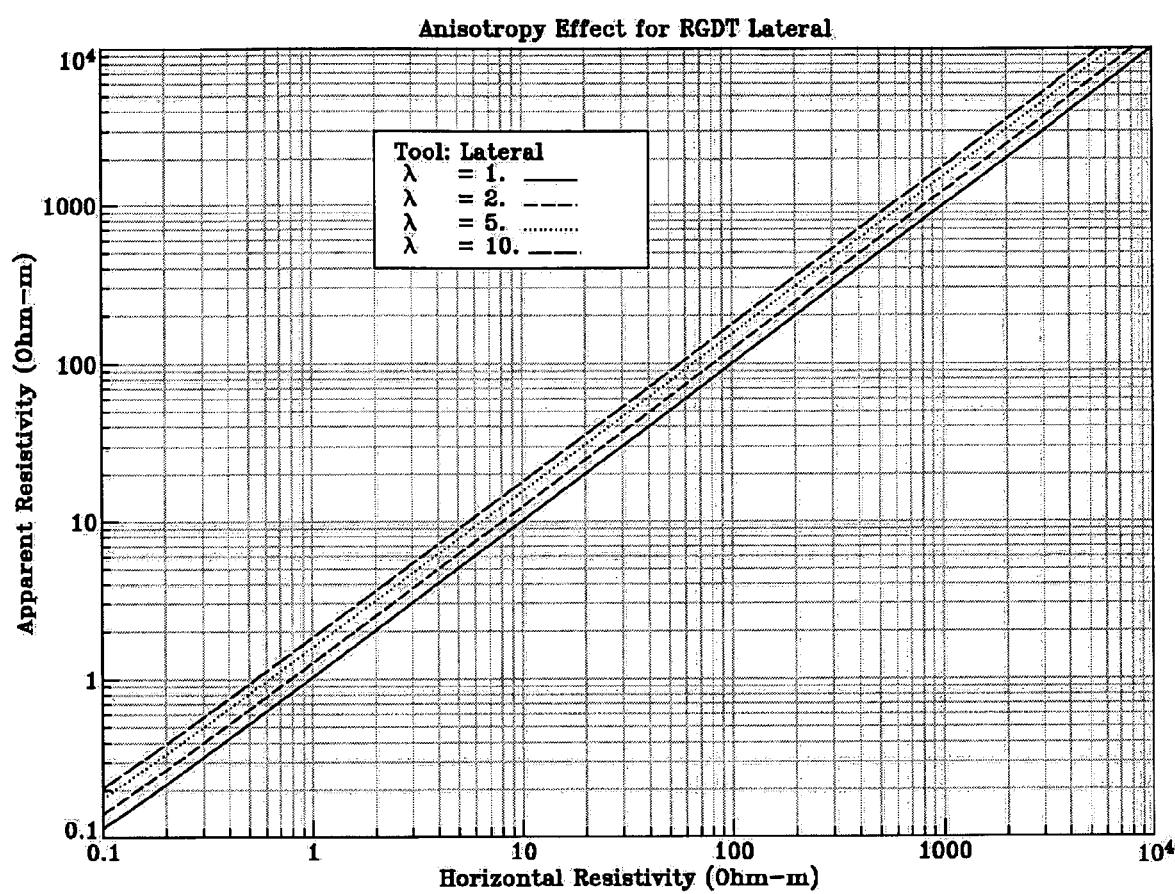
FIG. 6 is a graph relating horizontal resistivity to apparent resistivity for different formation anisotropies.

FIG. 6 shows the function of FIG. 4 on a logarithmic scale with different axes. The apparent resistivity (the inverse of conductivity) measured by the tool is shown as a function of the horizontal resistivity of the formation. Here it may be observed that a ten-fold increase in anisotropy yields a 75% change in the apparent resistivity. Accordingly if the method of FIG. 5 is used, there may be some loss of sensitivity in high-resistivity formations. This sensitivity problem might be aggravated by a loss of amplitude in the reactive voltage caused by a reduced skin-effect in highly resistive formations.

Figure 7:
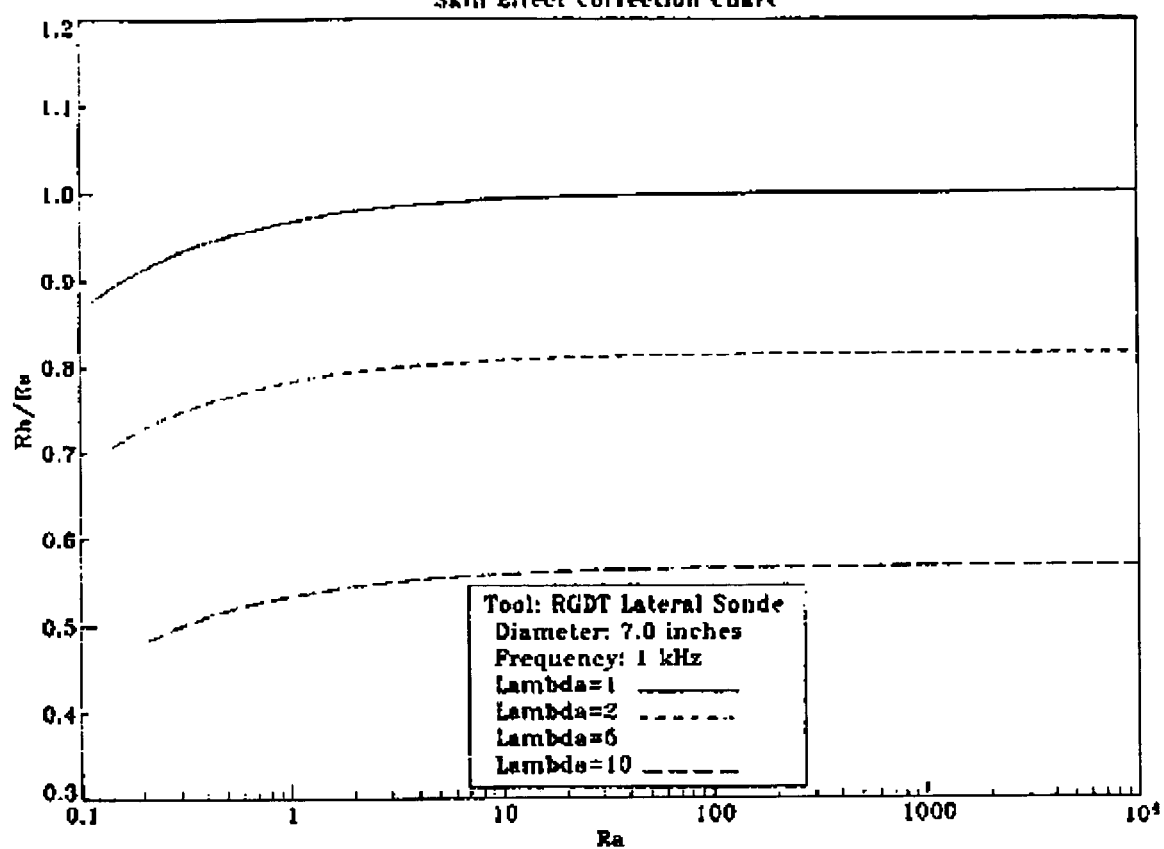
FIG. 7 shows the information of FIG. 6 in a different form.

A different presentation of the same data set as in FIG. 6 can be made in the form of a skin effect correction chart as in FIG. 7. It is clear that at normal operating frequencies the toroidal tool has only a modest amount of skin effect which is easily corrected. In fact, if the appropriate skin effect correction is applied, the apparent resistivity Ra of the tool is approximated within a few percent error:

$$R_a = \sigma^{1/4} R_h. \quad (3)$$

Note that in FIG. 2, the current flow lines (initially) run perpendicular to the drillstring. This advantageously reduces the borehole and invasion effects on the measurement and enhances the depth of investigation. The proposed tool is expected to work particularly well in salty muds where the existing tools are deficient. The tool operates on straightforward principles, and accordingly is expected have advantages over existing tools in terms of cost and ease of interpretation.

Theory of Operation

In accompaniment with the foregoing embodiments, the following analysis serves as a theoretical guide. Referring first to a vertical toroid (VTR) transmitter and a VTR receiver system where the VTRs are assumed to behave as point toroids, magnetic coupling (for a wireline application) can be expressed in units of apparent conductivity:

$$\sigma_a + i\sigma_x = \frac{\sigma_v}{\lambda^2}(1 - ik_h L)e^{ik_h L}, \quad (4)$$

$$\rightarrow \frac{\sigma_v}{\lambda^2}, \quad (5)$$

where the limiting form of Equation (5) represents the response in the absence of skin effect.

Focusing now on the case of HMD transmitters and HED receivers, the electric coupling can be shown to be:

$$\sigma_a + i\sigma_x = \frac{\sigma_h}{k_h^2 L^2}\left(\frac{1}{\lambda^2 + 1}\right)(1 - ik_h L)e^{ik_h L}, \quad (6)$$

$$\rightarrow \frac{\sigma_h + \sigma_v}{2}, \quad (7)$$

where the limiting form of Equation (7) represents the response in the absence of skin effect. Also, in the case of HED transmitters and HMD receivers, the magnetic coupling can be shown to be identical to Equations (6) and (7). It should be noted from the above analysis, that electric coupling measured by an electric dipole receiver can be replaced with a measurement of the magnetic field by a coil whose receiver plane is orthogonal to the electric dipole antenna, thus different combinations of horizontal versus vertical and magnetic versus electric dipole configurations are supported by this analysis. In addition, Equations (4)–(7) illustrate the perceived benefits of using the embodiments of FIG. 1 and FIG. 3 in measuring $\sigma_v$, as well as measuring overall anisotropy.

Alternative Toroid-Electrode Embodiment

With a momentary reference to FIG. 1, the toroidal receivers 108 and 110 may be used to take a differential measurement (as provided by Eqn. (2)), which serves as a measurement of the lateral current $I_1-I_2$ (i.e., the current escaping between the toroidal receivers as shown in FIG. 2. The extent of the surface from which the lateral current flows into the formation is delimited by the axially-spaced circumferences (or "perimeters") where the toroidal receivers are located.) The differential nature of this measurement does not affect the sensitivity to anisotropy and vertical conductivity as provided by Eqns. (4)–(5), and indeed, the sensitivity of the tool may be enhanced since the difference calculation may compensate for direct magnetic coupling between the transmitter and receivers. In any event, the differential measurement improves the vertical resolution of the tool by increasing sensitivity to the formations penetrated by the lateral current, particularly in those regions where the lateral current density is highest.

Figure 8:
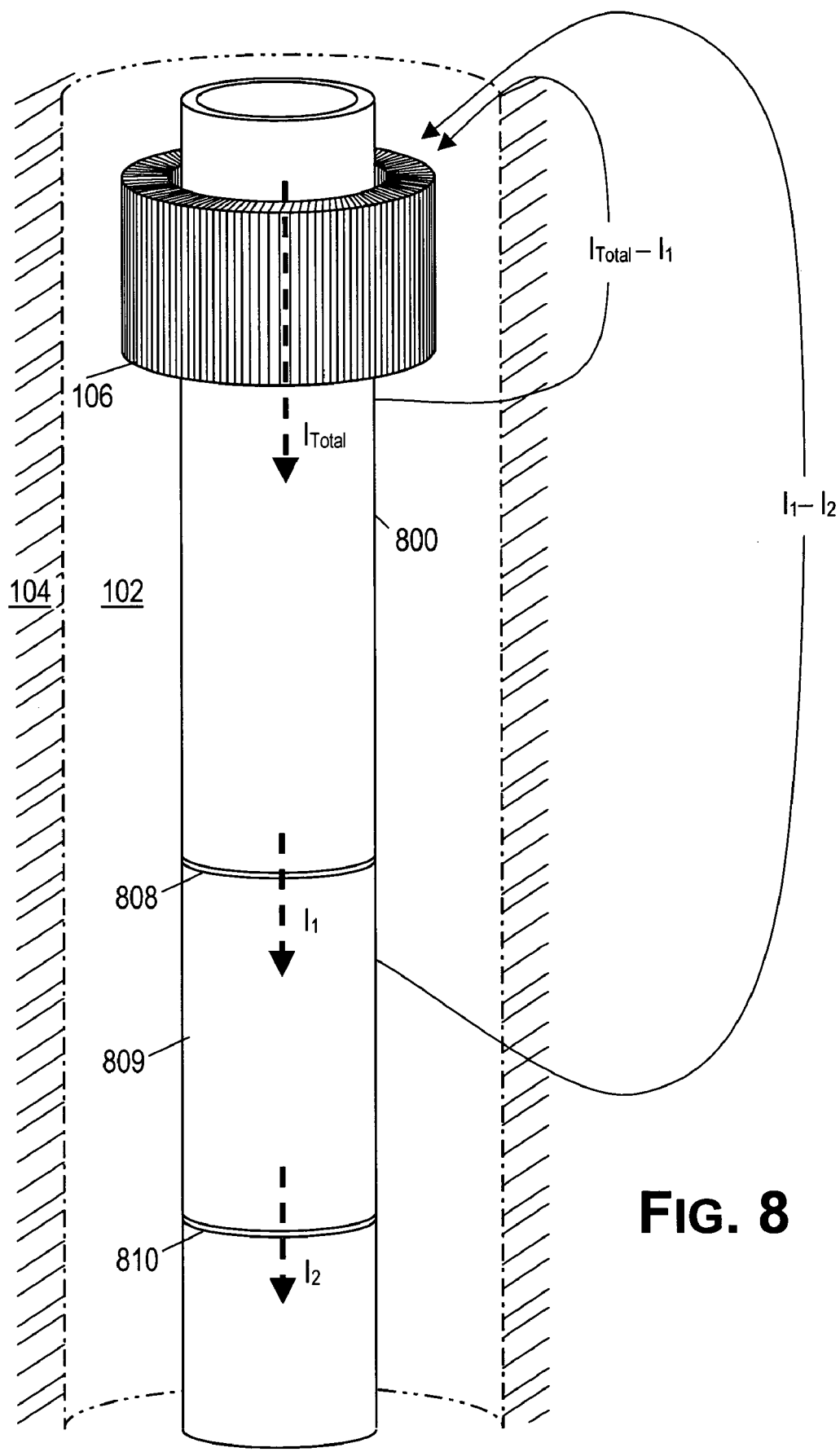
FIG. 8 shows another antenna configuration for an anisotropy tool using a toroidal transmitter.

The toroidal receivers can be eliminated if the measurement of lateral current is performed directly. FIG. 8 shows one such antenna configuration for an anisotropy measurement tool 800. The antenna configuration includes a toroidal transmitter 106, but the toroidal receivers of FIG. 1 are replaced by insulating perimeter gaps 808 and 810, axially separated by a conductive surface electrode 809. Tool 800 measures the current flowing from electrode 809, providing a lateral current measurement that is proportional to the differential measurement of tool 100.

Figure 9:
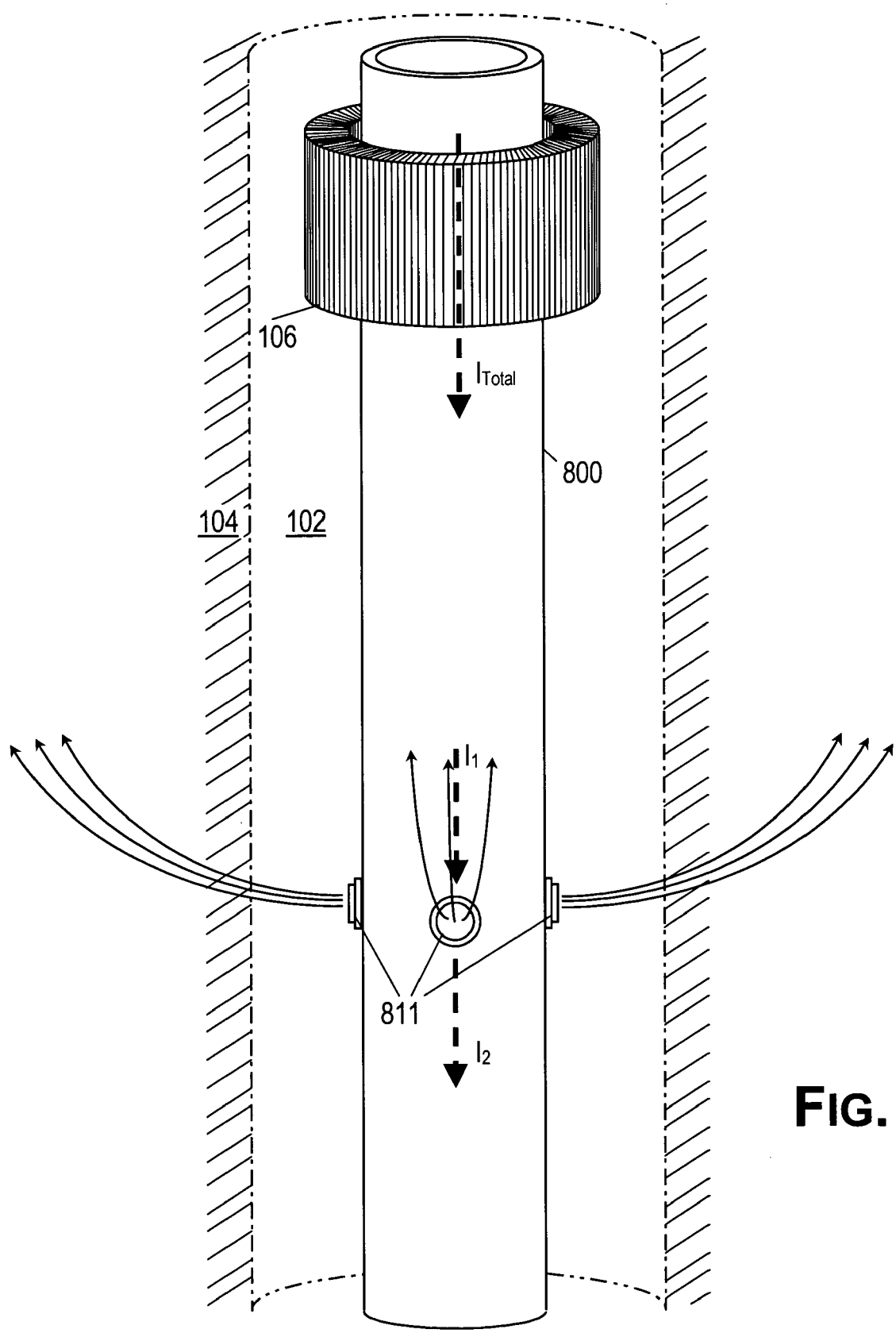
FIG. 9 shows yet another antenna configuration for an anisotropy tool using a toroidal transmitter.

FIG. 9 shows a variation of the FIG. 8 embodiment, in which surface electrode 809 has been replaced by circumferentially-spaced button electrodes 811. It is expected that the sum of currents from button electrodes 811 will approximate the current from surface electrode 809. The approximation improves as the number of button electrodes spaced around the circumference of the tool increases. Various embodiments with between four and sixteen button electrodes (inclusive) around the circumference are contemplated.

Figure 10:
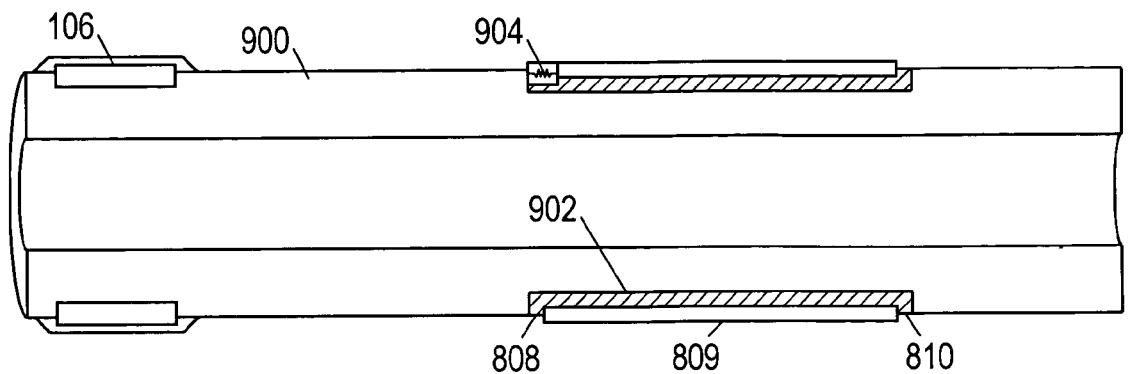
FIG. 10 shows one embodiment of the tool represented in FIG. 8.

FIG. 10 shows a cross-section of an illustrative implementation of the FIG. 8 tool configuration. In FIG. 10, tool 900 includes a toroidal transmitter 106 and a surface electrode 809 extending between axially spaced perimeter gaps 808 and 810. Surface electrode 809 extends around the circumference of tool 900, and extends along the length of tool 900 for a distance that represents the space between the omitted toroidal receivers. An insulating layer 902 separates electrode 809 from the tool body and extends into gaps 808, 810. A current sensor 904 is coupled between electrode 809 and the body of tool 900. In one embodiment, the current sensor may include a small series resistance (less than about 1 ohm) to provide a voltage drop from which the current flow can be determined. In another embodiment, a magnetic field sensor may be used to determine the current flow to the electrode.

Figure 11A:
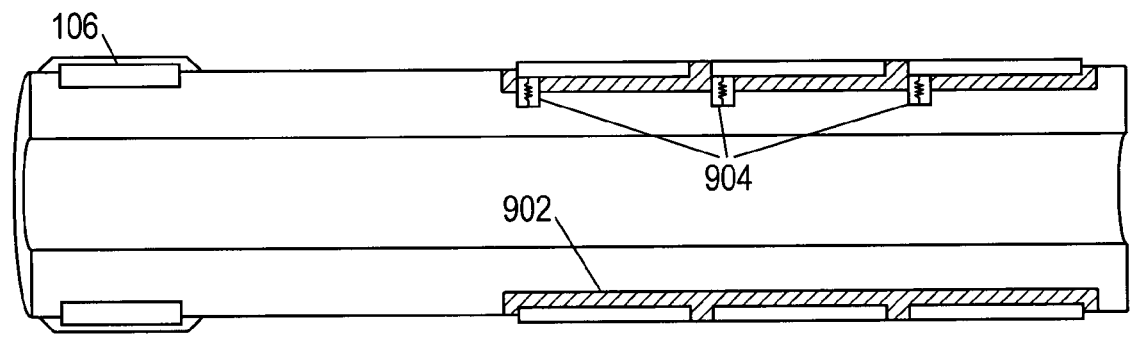
FIGS. 11A and 11B show multi-electrode variations of the FIG. 10 embodiment.
Figure 11B:
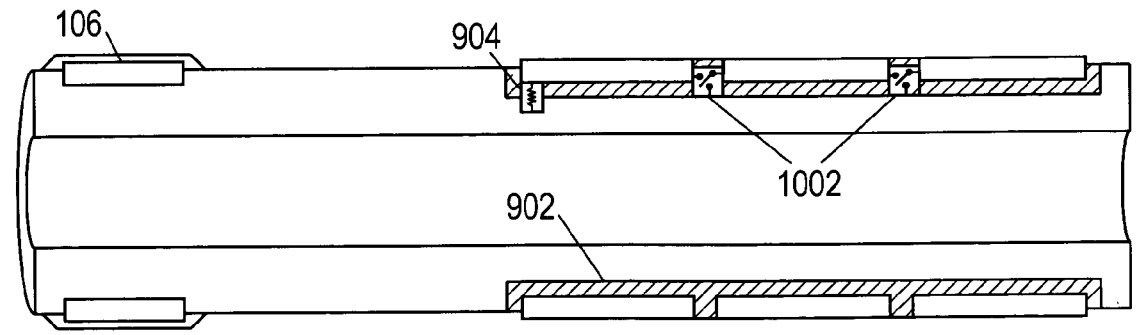

This toroid-electrode variation of the toroid-toroid anisotropy tool is expected to be more economically constructed and to be more reliable in service. Additional electrodes may be added to provide for different tool resolutions and/or deeper depths of investigation. A current sensor may be provided for each electrode as shown in FIG. 11A. Alternatively, a switch may be provided for each electrode after the first electrode as shown in FIG. 11B. The switches may provide an electrical connection to the tool body when current flow from the electrode is not being monitored. In the other position, the switches may disconnect from the tool body and electrically connect their respective electrodes to a preceding electrode, thereby effectively combining electrodes to create a larger electrode from which current flow is measured.

Figure 12:
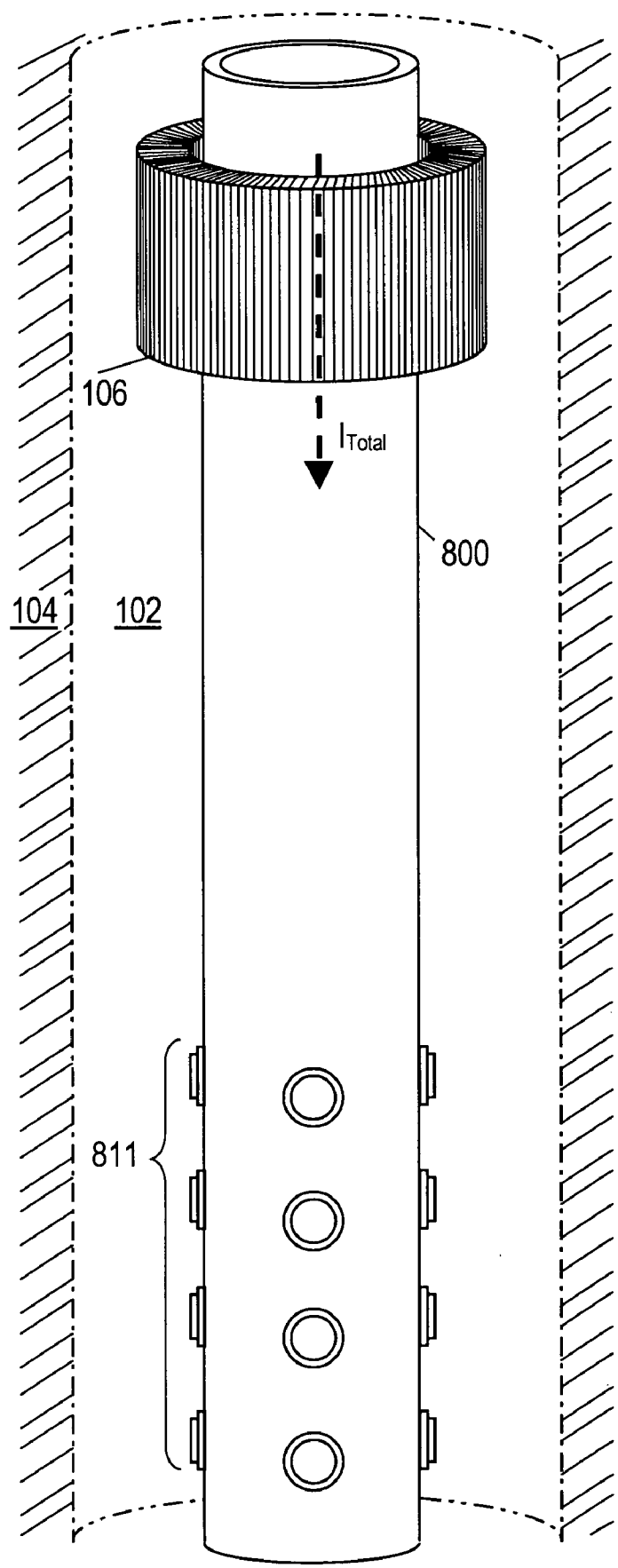
FIG. 12 shows a multi-depth variation of the FIG. 9 embodiment.

FIG. 12 shows a variation of the FIG. 9 embodiment. In FIG. 12, multiple rows of circumferentially spaced buttons are provided for monitoring current flows from multiple points along the tool. The current from each button may be monitored individually, or alternatively, some of the buttons may be electrically connected and the collective current flow may be monitored. The various current measurements may be processed to measure formation resistance and anisotropy at different positions and/or depths of investigation.

Numerous variations and modifications will become apparent to those skilled in the art once the above disclosure is fully appreciated. It is intended that the following claims be interpreted to embrace all such variations and modifications.

What is claimed is:

1. A method comprising:
    causing an alternating current to flow along the conductive surface of a tool body so as to dissipate into a surrounding formation;
    measuring a lateral current flow from the tool body, said lateral current flow being the current flowing from the tool body surface between two predetermined, axially-spaced, perimeters; and
    determining an apparent conductivity of the formation from an in-phase component of the lateral current flow measurement; and
    calculating an anisotropy coefficient from the apparent conductivity.

2. The method of claim 1, wherein said causing an alternating current to flow includes energizing a toroidal transmitter attached to the tool body.

3. The method of claim 2, wherein the toroidal transmitter is not between the two predetermined perimeters.

4. The method of claim 1, wherein said measuring a lateral current flow includes:
    measuring a signal difference between two toroidal receivers positioned at the two predetermined perimeters.

5. The method of claim 1, wherein said measuring a lateral current flow includes:
    measuring a current flowing from the tool body to a surface electrode extending between the two predetermined perimeters.

6. The method of claim 1, wherein said measuring a lateral current flow includes:
    measuring a current flowing from the tool body to button electrodes positioned between the two predetermined perimeters.

7. The method of claim 1, further comprising:
    calculating a vertical conductivity from the apparent conductivity.

8. The method of claim 1, further comprising:
    determining a second apparent conductivity of the formation from a reactive component of the lateral current flow measurement,
    wherein said calculating an anisotropy coefficient includes operating on both apparent conductivities.

9. The method of claim 8, further comprising:
    determining a horizontal conductivity from both apparent conductivities.

10. An apparatus comprising:
    a substantially cylindrical tool body having its circumference bounded by one or more electrically conductive surfaces;
    a toroidal transmitter attached to the tool body to generate an alternating current flow that radiates from the one or more electrically conductive surfaces into a surrounding formation;
    a sensing arrangement to measure that portion of the alternating current that radiates between two predetermined circumferences of an electrically conductive surface, and
    electronics that convert measurements of said portion of the alternating current into anisotropy coefficient values.

11. The apparatus of claim 10, wherein the sensing arrangement includes:
    a first toroidal receiver positioned at a first of the two circumferences to measure a current flow across the first circumference; and
    a second toroidal receiver positioned at a second of the two circumferences to measure a current flow across the second circumference.

12. The apparatus of claim 10, wherein the sensing arrangement includes button electrodes positioned between the two predetermined circumferences.

13. The apparatus of claim 10, wherein the electronics determine horizontal and vertical conductivity values.

14. An apparatus comprising:
    a substantially cylindrical tool body having its circumference bounded by one or more electrically conductive surfaces;
    a toroidal transmitter attached to the tool body to generate an alternating current flow that radiates from the one or more electrically conductive surfaces into a surrounding formation; and
    a sensing arrangement to measure that portion of the alternating current that radiates between two predetermined circumferences of an electrically conductive surface, wherein the sensing arrangement includes:
        an electrically conductive surface electrode enclosing the tool body between the two predetermined circumferences and electrically insulated from the tool body; and
        a current detector coupled between the electrode and the tool body.

15. A system comprising:
    surface processing equipment; and
    a downhole logging tool that includes:
        a tool body largely bounded by an electrically conductive surface; and
        a toroidal transmitter to induce an alternating current flow that passes through the electrically conductive surface and into a surrounding formation; and
        two or more toroidal receivers to measure that portion of the induced current passing through the electrically conductive surface between each pair of toroidal receivers,
    wherein the surface processing equipment communicates with the downhole logging tool to receive said measurements, and wherein the surface processing equipment processes the measurements to determine an anisotropy coefficient and a vertical conductivity, each as a function of logging tool position.

16. The system of claim 15, wherein the surface processing equipment is further operable to process the measurements to determine a horizontal conductivity as a function of logging tool position.

17. The system of claim 15, wherein as part of processing the measurements, the surface processing equipment determines a resistive apparent conductivity and a reactive apparent conductivity from the measurements.

18. A system comprising:
surface processing equipment; and
a downhole logging tool that includes:
- a tool body largely bounded by an electrically conductive surface; and
- a toroidal transmitter to induce an alternating current flow that passes through the electrically conductive surface and into a surrounding formation; and
- a current sensor coupled between the tool body and an electrically insulated portion of the electrically conductive surface to measure that portion of the induced current passing through said portion of the electrically conductive surface, wherein the surface processing equipment communicates with the downhole logging tool to receive said measurements, and wherein the surface processing equipment processes the measurements to determine an anisotropy coefficient as a function of logging tool position.

19. The system of claim 18, wherein the surface processing equipment processes the measurements to determine a vertical conductivity as a function of logging tool position.

20. The system of claim 18, wherein the surface processing equipment processes the measurements to determine a horizontal conductivity as a function of logging tool position.

21. The system of claim 18, wherein as part of processing the measurements, the surface processing equipment determines a resistive apparent conductivity and a reactive apparent conductivity from the measurements.

* * * * *